Nov. 27, 1962  L. S. CLINKENBEARD  3,065,656
DRILLING ATTACHMENT
Filed Feb. 5, 1962  2 Sheets-Sheet 2
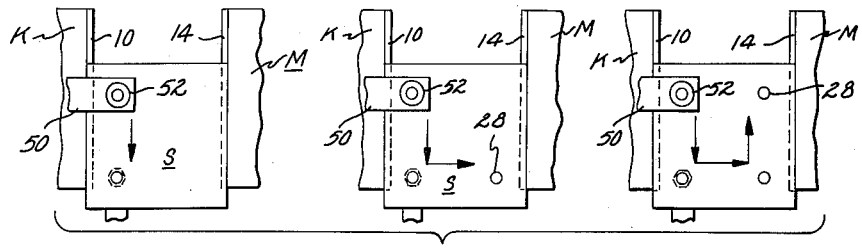
FIG. 8
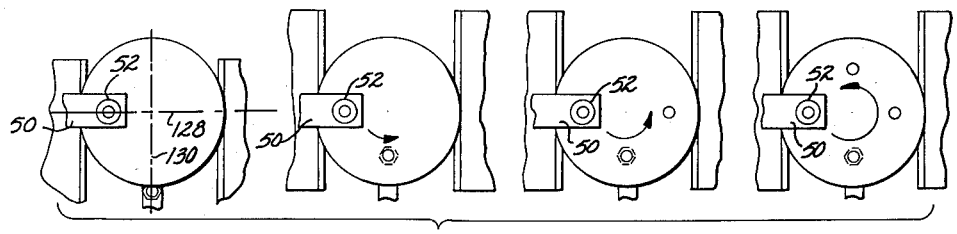
FIG. 9
FIG. 10
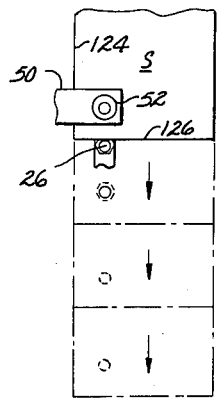
FIG. 11
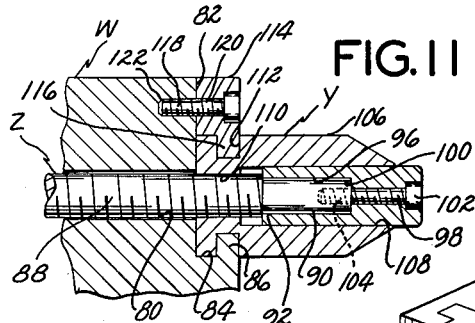
FIG. 12
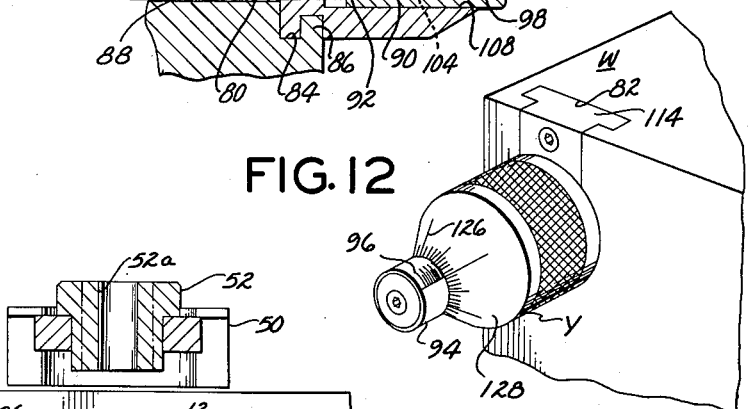
FIG. 13
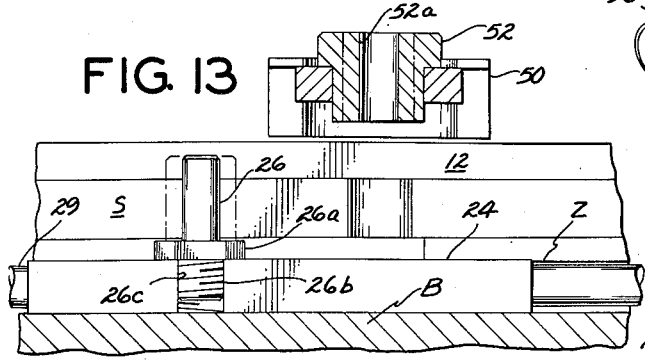
INVENTOR.
LEWIS S. CLINKENBEARD
BY
William P. Babcock
ATTORNEY

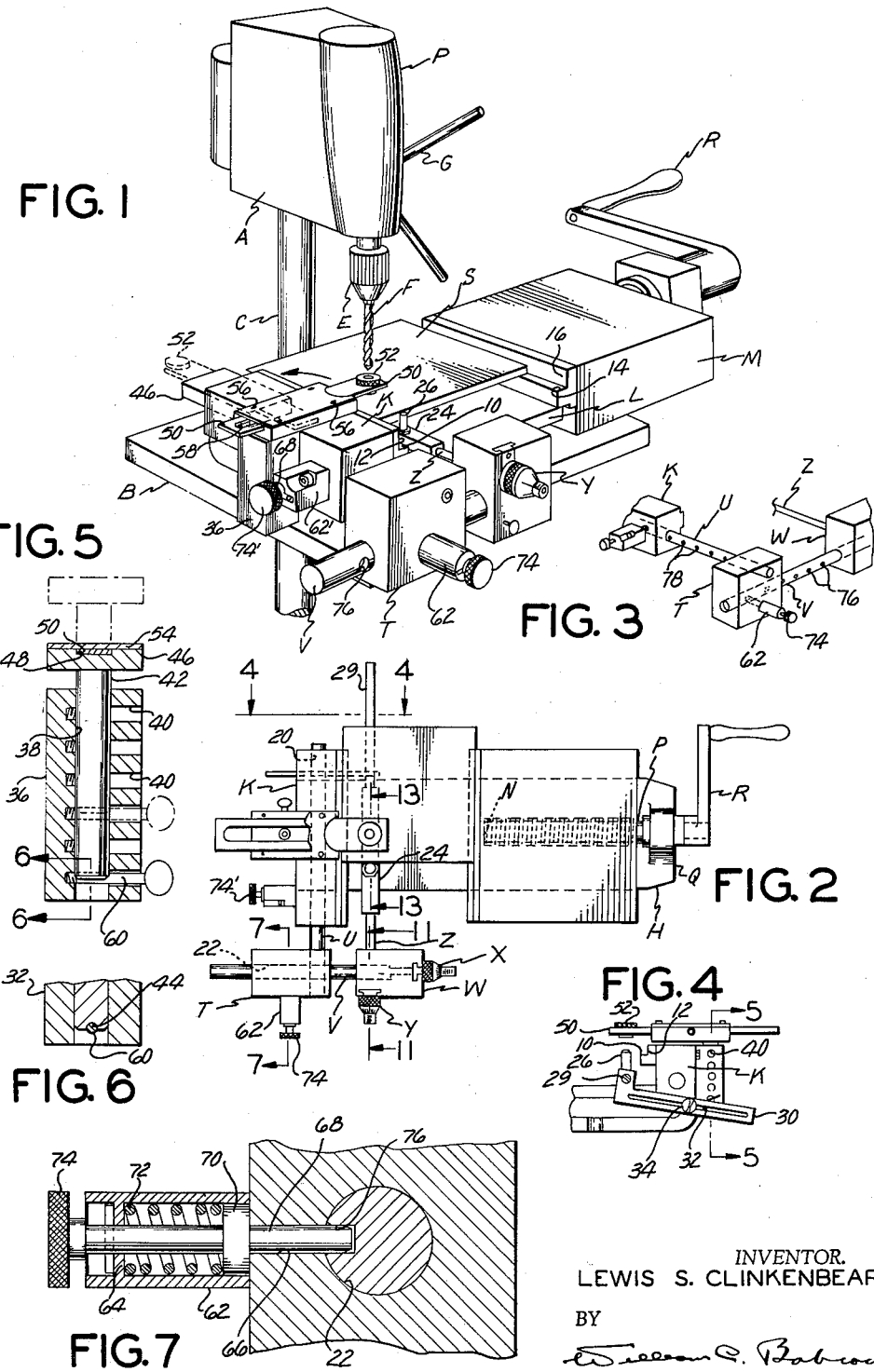

United States Patent Office 3,065,656
Patented Nov. 27, 1962

3,065,656
DRILLING ATTACHMENT
Lewis S. Clinkenbeard, 11545 Davenrich St.,
Santa Fe Springs, Calif.
Filed Feb. 5, 1962, Ser. No. 171,024
9 Claims. (Cl. 77—64)

The present invention relates generally to the field of machine shop accessories, and more particularly to a drilling attachment by means of which rapid and accurate drilling of holes can be made in either a round or square workpiece.

In machine shop work the forming of a number of parts each having identically spaced holes or openings therein has, in the past, presented a number of operational difficulties. A common expedient in drilling such a sequence of identically spaced openings in a series of parts has been to use a drilling template, or in lieu thereof, to first form a part having openings formed therein in the desired spaced relationship, and then use this part as a pattern to duplicate the spacing of holes in like additional parts in the quantity required. However, the disadvantage of using either a template or a part as a pattern lies in the fact that the openings therein through which the drill passes in drilling additional parts become worn through frictional contact with the rotating drill, and as a result the parts subsequently produced in all probability have holes drilled therein that do not truly conform to the spacing of the holes in the template or the part used as a pattern.

A primary object of the present invention is to provide a drilling attachment that may be used equally well on either round, square, or rectangular workpieces, and one in which all error through contact with a rotating drill is eliminated.

Another object of the invention is to provide a drilling attachment that eliminates the necessity of employing a layout of the spacing, duplicate parts or pattern, yet which is extremely rapid to use and by means of which the spacing of the drilled holes can be maintained at a high degree of accuracy.

A further object of the invention is to provide an attachment that permits drilling of holes in circular spacing without the use of a dividing head or turntable.

A still further object of the invention is to provide an attachment in which the boring of holes can be drilled in desired spacing without limitation as to the length of the workpiece in which these holes are bored.

These and other objects and advantages of the invention will become apparent from the following description of a preferred form thereof and from the accompanying drawings illustrating that form in which:

FIGURE 1 is a perspective view of the attachment mounted on a drill press;

FIGURE 2 is a top plan view of the attachment shown in FIGURE 1;

FIGURE 3 is a schematic diagram illustrating in general the internal operation of the attachment;

FIGURE 4 is a vertical side elevational view of the attachment taken on line 4—4 of FIGURE 2;

FIGURE 5 is a fragmentary vertical cross-sectional view of the attachment taken on line 5—5 of FIGURE 4;

FIGURE 6 is a fragmentary vertical cross-sectional view of a portion of the attachment taken on line 6—6 of FIGURE 5;

FIGURE 7 is a vertical cross-sectional view of the attachment taken on line 7—7 of FIGURE 2;

FIGURE 8 is a diagrammatic view of a portion of the attachment showing in sequence the steps used in drilling four longitudinally and laterally spaced bores in a workpiece;

FIGURE 9 is a fragmentary plan view of the attachment illustrating the manner in which a number of holes are drilled in circular spaced relationship in a workpiece;

FIGURE 10 is a fragmentary top plan view of the attachment illustrating the manner in which a sequence of longitudinally spaced bore holes may be drilled in the workpiece;

FIGURE 11 is an enlarged vertical cross-sectional view of a portion of the attachment taken on the line 11—11 of FIGURE 2;

FIGURE 12 is a perspective view illustrating that portion of the attachment shown in section in FIGURE 11; and FIGURE 13 is a vertical cross-sectional view of the attachment taken on line 13—13 of FIGURE 2.

Referring now to FIGURES 1 and 2 of the drawings for the genral arrangement of the invention, it will be seen to be illustrated ready for use on a drill press A having a horizontal table B that is supported on an upright C. Upright C supports a head D from which a power driven chuck E depends, and removably supports a drill F, reamer or other desired tool. Upward and downward movement of the chuck E and drill F is controlled by a handle G as is conventional in drill presses.

The attachment of the present invention includes an elongate base H, partially shown in FIGURES 1 and 2, that is rigidly affixed to the table B or other desired supporting surface, by conventional means (not shown). Base H is a part of a vise, referred to generally by the letter J, which in turn includes a first jaw K rigidly affixed to the base H that projects upwardly from the lefthand end portion of the base as shown in FIGURE 1. A rigid member L projects horizontally to the right from first jaw K as illustrated in FIGURES 1 and 2, and slidably engages a second jaw M that forms a part of vise J. A horizontal threaded rod N engages a tapped bore O which extends partially through the second jaw M. The rod N also includes an unthreaded portion P that is rotatably mounted in a journal block Q affixed to base H. A crank R or other rotating means is provided to rotate rod N. When rod N is rotated in an appropriate direction, the second jaw M may be moved either towards or away from the first jaw K.

Jaw K defines a first flat horizontal shoulder 10 and a first vertical face 12 on the right-hand side thereof as shown in FIGURES 1 and 2. Second jaw M defines a flat horizontal second shoulder 14 that lies in the same plane as first shoulder 10. A second vertical face 16 extends upwardly from second shoulder 14 on second jaw M, as may best be seen in FIGURE 1.

The first and second shoulders 10 and 14 serve to removably support a workpiece S, which is removably gripped in this supported position between faces 12 and 16 when second jaw M is caused to move towards first jaw K, as may best be seen in FIGURE 1.

A first block T is rigidly affixed to the forward end portion of a rod U that is slidably supported in a bore 20 that extends rearwardly from the forward face of the first jaw K. Block T has a bore 22 extending therethrough in a direction normal to the rod U, and bore 22 slidably supports a second rod V. The second rod V on the righthand end thereof supports a second block W that is longitudinally adjustable relative thereto by micrometer means X that will later be explained in detail.

A second micrometer means Y is disposed on the forward face of block W that likewise will be described hereinafter. When micrometer means Y is rotated in an appropriate direction it causes a rod Z to move forwardly or rearwardly relative to the second block W. Rod Z is connected to an elongate rectangular bar 24 that may best be seen in FIGURES 1 and 2. Bar 24 removably supports a pin 26 that is of such transverse cross section as to snugly and slidably engage the bores 28 being drilled in the workpiece S by the drill F. The use and operation of the pin 26 will be described in detail hereinafter. A second rod 29 projects rearwardly from the bar 24, and the rearward portion thereof is slidably supported in a member 30, as shown in FIGURE 4.

The member 30 has an elongate slot 32 formed threin that engages a screw 34 which extends into the rear face of the first jaw K. When the second block W is moved relative to first block T, the first rod Z, bar 24, and second rod 29 move concurrently therewith. Jaw K includes a portion 36, best seen in FIGURES 1, 5 and 6, that has a centrally disposed bore 38 extending downwardly therethrough. A number of horizontal, vertically spaced bores 40 are also formed in the portion 36 which communicate with the bore 38. An elongate rigid member 42 of circular transverse cross section is mounted for slidable and rotational movement in the bore 38. Member 42 (FIGURE 6) has a transverse groove 44 formed in the lower end surface thereof. A rectangular head 46 projects from the upper end of member 42. A longitudinally extending recess 48 is formed in head 46, and supports a plate 50. A drill guide 52 is mounted on and extends downwardly through the outer end portion of plate 50. A cover 54 is affixed to the upper surface of the head 46 by screws 56 or other conventional means and holds the plate 50 within the confines of the slot 48. A longitudinally extending slot 58 is formed in plate 50 that slidably engages a stop (not shown) to prevent inadvertent withdrawal of the plate from the recess 48.

A pin 60 is provided that may be slidably inserted in any one of the bores 40. When disposed in any one of the bores 40, pin 60 also extends into the bore 38. As may best be seen in FIGURE 5, when pin 60 is inserted in any one of the bores 40 it serves to support the member 42 at a desired elevation. The workpiece S may, of course, vary in thickness and project above the jaws K and M. It will be obvious that when the workpiece does project above the jaws K and M, it is necessary that the member 42 be raised sufficiently to position the head 46 and drill guide 52 above the upper surface of the workpiece. When the drill guide 52 is not in use, the head 46 and member 42 can be pivoted relative to the jaw portion 36 to place the head and drill guide in the position shown in phantom line in FIGURE 1. When member 42 is in a position to support the head 46 as shown in FIGURE 1, the pin 60 engages the transverse groove 44 and prevents inadvertent pivoting of member 42 and head 46 to the position shown in phantom line in the same figure.

A cylindrical body 62 projects outwardly from the first block T, as shown in FIGURES 2 and 7. Body 62 has an inwardly extending ring 64 situated adjacent the outer end thereof, and this body is in longitudinal alignment with a bore 66 formed in block T. Bore 66 is in communication with bore 22 and is disposed in a direction normal thereto.

A lock bolt 68 (FIGURE 7) is slidably supported in body 62 by the ring 64 and bore 66. Bolt 68 has a collar 70 mounted thereon that is slidably movable inside body 62. A compressed helical spring 72 is situated within body 62, with one end of the spring abutting against the ring 64 and the other end against the collar 70. A knurled handle 74 is mounted on the outer extremity of the bolt 68, as may best be seen in FIGURE 7.

The second rod V, as best shown in FIGURES 3 and 7, has a number of longitudinally spaced recesses 76 formed therein. Each of the recesses 76 is adapted to be snugly and slidably engaged by the inwardly disposed end portion of the bolt 68 (FIGURE 7). The centers of recesses 76 are accurately spaced from one another so that as bolt 68 is moved outwardly from one of the recesses and subsequently caused to engage another of the recesses, the distance the rod V is required to move to permit such engagement is accurately known. The first rod U (FIGURE 3) also has a number of longitudinally spaced recesses 78 formed therein.

First jaw K has a body 62' extending outwardly therefrom that serves the same function as the body 62. Body 62' slidably supports a spring-loaded locking bolt 68' that is structurally identical to that shown in FIGURE 7, and accordingly a detailed description thereof is unnecessary. Bolt 68' has a knurled handle 74' or other means on the outer end thereof for manipulating the same. The recesses 78 are accurately spaced from one another so that as the bolt 68' is removed from one recess and the first rod U and first block T attached thereto are moved relative to the first jaw K to a position where the locking bolt 68' can be inserted in another of the recesses, the distance rod U and block T move during this operation is accurately known.

The detailed structure of the second micrometer means Y is best seen in FIGURES 11 and 12. The second block W has a bore 80 extending transversely therethrough. A recess 82 extends downwardly on the outer end of block W and the lower end thereof terminates in a semicircular portion 84. The portion 84 has a semi-circular rib 86 projecting upwardly from the outer edge thereof. Rod Z (FIGURES 2 and 11) has threads 88 formed on the outer end portion thereof, and also includes an unthreaded cylindrical extension 90. Extension 90 is smaller in transverse cross section than the threaded portion of rod Z. Extension 90 and the threaded portion of the rod Z define a circumferentially extending body shoulder 92 at the junction thereof.

A cylindrical member 94 is provided, on the exterior surface of which a series of graduations 96 are formed, as may best be seen in FIGURE 12. Member 94 has a longitudinally extending bore 96 and counterbore 98 formed therein, which at the junction thereof define a circumferentially extending body shoulder 100. A screw 102 extends through counterbore 98 to engage a tapped cavity 104 formed in extension 90. When screw 102 is tightened, the cylindrical member 94 is rigidly held in position on rod Z, as may best be seen in FIGURE 11.

A cylindrical micrometer head 106 is provided that has a longitudinally extending bore 108 formed therein, in which the cylindrical member 94 is disposed. Bore 108 is in longitudinal alignment with a tapped counterbore 110 that engages the threads 88 on rod Z. Head 106 has a circumferentially extending groove 112 of square transverse cross section formed therein which is slidably and rotatably engaged by rib 86.

A block 114 of such shape as to be slidably insertable in the recess 82 is provided. Block 114 has a semi-circular rib 116 formed on the lower outer edge portion thereof which slidably engages the groove 112. Block 114 is removably held in recess 82 by means of a screw 118 that extends through a bore 120 formed therein to engage a tapped recess 122 formed in the second block W. The head 106 has a number of circumferentially spaced graduations 126 formed on the forward tapered portion 128 thereof.

By manipulation of the head 106, the rod Z, bar 24, pin 26, and rod 29 can be concurrently moved relative to the second block W, as best shown in FIGURE 1. The first micrometer means X has the same general structure as the second micrometer means Y, and therefore a detailed description of means X is unnecessary. When the first micrometer means X is manipulated it permits the second block W, together with the rod Z, rectangular bar 24, pin 26, and rod 29 to be moved either towards or away from the first jaw K and first block T.

The operation of the invention is relatively simple. The longitudinal spacing of the recesses 76 and 78 in rods V and U respectively, may be any desired distance, such as on one-half inch centers for example. The second micrometer means Y and the length of the rod Z, bar 24, and pin 26 are so operatively associated that the longitudinally extending center line of the drill guide 52 and center line of the drill F are in coaxial alignment when the micrometer means Y have a fixed reading, at zero on the graduations 96 and 126 (FIGURE 12) for instance. The recesses 76 on the second rod V are so located that the distance of the center of each recess is known relative to the vertical face 12 of the first jaw K. Thus, if it is desired to drill a sequence of bores 28 in a workpiece S as shown in FIGURE 10, and it is desired that the centers of the bores be located one inch from the left-hand edge 124 of the workpiece, the handle 74 (FIGURES 2 and 7) would first be moved outwardly.

Outward movement of handle 74 frees the lock bolt 68 from engagement with the recesses 76 and permits the second block W to be moved to the right as shown in FIGURE 1. Assuming that the recesses 76 are on one-half inch centers, after the block W has been moved more than one-half inch but less than a full inch, the handle 74 is released. Movement of the second block W is continued, and when the lock bolt 68 is in alignment with the next recess 76, it will automatically snap therein due to the action of spring 72 whereby the block W will then be so disposed relative to jaw K that the center line of pin 26 is separated exactly one inch from the vertical face 12 of the jaw K. If the spacing desired for the bore hole 28 from the side 124 of workpiece S, as shown in FIGURE 10, were not a multiple of one-half inch, the block W would be moved as previously described and the additional distance added or subtracted from the moved distance by manipulation of the first micrometer means X.

The location for the first bore 28 to be drilled in workpiece S is obtained by moving the handle 74' outwardly to permit the first block T, rod V, second block W, second micrometer means Y, rod Z, block 24, pin 26, and rod 29 to be moved as an integral unit to place the pin 26 in a position where the edge 126 of the workpiece abuts thereagainst, as shown in FIGURE 10. After this positioning has been secured the handle 74' is released, and as previously described, it snaps into place automatically in an appropriate one of the recesses 78. In drilling the first bore 28 in the workpiece S, the diameter of the pin 26 must be taken into account for the side 126 is abutting against the external surface of pin 26, rather than being in alignment with the longitudinal center line thereof. After the first bore 28 is drilled as shown in FIGURE 10, the crank R is rotated to free the workpiece from jaws K and M.

The handle 74' and the second micrometer means Y may then be used to manually adjust the center line of pin 26 a desired distance from the center line of drill F. The first drilled bore 28 is then caused to engage pin 26. Crank R is rotated to cause second jaw M to move towards first jaw J and grip the workpiece S therebetween. A second bore 28 may thereafter be drilled. After the second bore 28 has been drilled, the above described operation is repeated, with the second bore 28 then being caused to engage pin 26 to orient the workpiece for the drilling of the third bore. This drilling operation is performed under the assumption that all of the bores 28 to be drilled are on the same centers and is illustrated in FIGURE 10.

If the workpiece S is square, the above operation can be employed to drill bores 28 therein in the manner shown in FIGURE 8, if the workpiece is rotated 90° after each drilling operation. If a circular workpiece S is being worked as illustrated in FIGURE 9, the handles 74 and 74' and first and second micrometer means Y and X are used to so dispose the workpiece that the center lines 128 and 130 thereof are in alignment with the center lines of drill F and pin 26 respectively. The procedure used in drilling the square workpiece S (FIGURE 9) is then employed to drill four bores 28 that are separated from one another by 90°. When the spacing between successive bores being drilled is not constant, the appropriate handles 74, 74' and first and second micrometer means X and Y must be manipulated to provide the necessary spacing between pin 26 and drill F.

In the use of the invention, it will be particularly noted that the pin 26 is initially used as a stop to obtain positioning for the drilling of the fire bore 28, and after this first bore is drilled, as a means to positively engage the same to obtain the position for the second bore.

Also, a number of the pins 26 are provided, which will range in transverse cross section from the size of the pin shown in FIGURE 13 to that shown in phantom line in the same figure. The necessity for a number of different sized pins 26 is that bores 28 of various sizes may be drilled in the workpieces S by appropriate sized drills F. Accordingly, it is necessary to have a set of pins 26 of varying cross section, such that one thereof will engage a particular one of these different sized bores. The pins 26 each include nuts 26a formed as an integral part thereof and threaded shanks 26b of the same transverse cross section that extend downwardly from the nut to engage a tapped bore 26c formed in the third block 24, as may best be seen in FIGURE 13.

Likewise, drill guides 52 of various sizes are provided, with each of the drill guides 52 being removably affixed to the plate 50 by conventional means as shown in FIGURE 13. The drill guides 52 will be of identical exterior configuration to removably engage the plate 50, but will have bores 52a extending therethrough that may range in cross section from that shown in solid line in FIGURE 13 to that shown in phantom line in the same figure. Thus, by the use of interchangeable drill guides 52 as well as interchangeable pins 26, the invention can be used with any one of a number of drills F. The drills F will, of course, be of the standard commercially available sizes.

Although the present invention is fully capable of achieving the objects and providing the advantages hereinbefore mentioned, it is to be understood that it is merely illustrative of the presently preferred embodiment thereof and I do not mean to be limited to the details of construction herein shown and described, other than as defined in the appended claims.

I claim:

1. A device for sequentially holding a plurality of workpieces so that a plurality of bores may be drilled in each thereof on the same center-to-center spacing by a power-driven drill, including:
   (a) a first jaw;
   (b) a second jaw movably supported relative to said first jaw;
   (c) first means for moving said second jaw towards and away from said first jaw for holding one of said workpieces between said jaws to permit said drill to drill one of said bores therein when said drill is moved towards said workpiece, and to release said workpiece from said jaws after one of said bores is drilled therein;
   (d) first, second and third blocks;
   (e) a first rod projecting from said first block, which rod is slidably mounted in a first bore in said first jaw;
   (f) a second rod projecting from said second block, said second rod being slidably mounted in a second bore in said first block, with said second bore being in a direction normal to the longitudinal axis of said first rod;
   (g) a third rod projecting from a third bore in said second block and rigidly connected to said third block, which third bore is situated in a direction normal to said second bore;
   (h) second means on said first first jaw for selectively locking said first rod at any one of a desired plurality of positions relative thereto;
   (i) third means on said first block for selectively locking said second rod at any one of a desired plurality of positions relative thereto;

(j) fourth means for moving said third rod and third block a desired distance relative to said second block;

(k) fifth means for moving said second block, third rod and third block relative to said second rod; and (l) a pin that extends upwardly from said third block, said pin being of such transverse cross section as to snugly and slidably engage each bore drilled in said workpiece by said drill, said pin being positionable by the use of said first, second, third and fourth means to contact a side of said workpiece and act as a stop in positioning each of said workpieces to permit said first and second jaws to grip the same for the first of said bores to be drilled therein, which pin when said third block has been moved to a desired spacing relative to the center line of said drill successively engages each of said bores to permit another of said bores to be drilled in said workpiece by said drill.

2. A device as defined in claim 1 wherein said first rod has a plurality of axially aligned recesses formed therein that are longitudinally spaced from one another known distances, and said second means is a spring-loaded bolt that is movably supported from said first jaw, which bolt due to said spring-loading is at all times urged towards said first rod, with said bolt automatically moving inwardly to enter one of said recesses when said recess is brought into alignment therewith.

3. A device as defined in claim 1 wherein said second rod has a plurality of axially aligned recesses formed therein that are longitudinally spaced from one another known distances, and said third means is a spring-loaded bolt that is movably supported from said first block, which bolt due to said spring-loading is at all times urged towards said second rod, with said bolt automatically moving inwardly to enter one of said recesses in said second rod when said recess is brought into alignment therewith.

4. A device as defined in claim 1 wherein said fourth means includes a cylindrical head having graduations formed thereon, which head is rotatably supported on said second block and has a tapped bore formed therein, with said third rod having a threaded end portion that threadedly engages said tapped bore, said head when rotated moving said third block, said third rod, and said pin relative to said second block, with the movement of said second block relative to said second rod being limited to a distance less than the distance between two of said recesses formed in said first rod.

5. A device as defined in claim 1 wherein said fifth means is a cylindrical head having graduations formed thereon, said head having a longitudinally extending tapped bore formed therein, with said second rod having a threaded end portion that engages said tapped bore in said head, which head when rotated moves said second block, said third rod, said third block and said pin relative to said second rod with said movement of said second block due to said head being limited to a distance that is less than that between two of said recesses formed in said second rod.

6. A device as defined in claim 1, which further includes a fourth rod projecting from said third block in a direction opposite that from which said third rod extends, and adjustable supporting means for supporting the end of said fourth rod opposite the end thereof adjacent said third block.

7. A device as defined in claim 1 which further includes:

(a) a drille guide;

(b) an elongate plate supporting said drill guide on one end thereof;

(c) a head for adjustably supporting said plate in a position above said workpiece;

(d) a rod extending downwardly from said head;

(e) a body extending outwardly from said first jaw, which jaw has a downwardly extending recess formed therein that pivotally supports said rod on which said head is mounted; and (f) means for supporting said rod at any one of a plurality of different elevations in said body, to permit said head to be disposed above the upper surface of said workpiece during the drilling of a plurality of bores therein.

8. A device as defined in claim 7 wherein said means is a plurality of vertically spaced bores that are in communication with said bore in said body in which said rod is disposed, and a pin that can be inserted in any one of said vertically spaced bores to extend into said bore in which said rod is disposed to support said rod therein at any one of a plurality of desired elevations relative to said body.

9. A device as defined in claim 8 wherein said rod has a transverse groove formed on the lower end thereof with said groove when engaging said pin maintaining said head in a position where it extends outwardly over said workpiece to hold said drill guide in longitudinal alignment with said drill.

References Cited in the file of this patent

UNITED STATES PATENTS

| | | |
|---|---|---|
| 1,017,846 | Budlong | Feb. 20, 1912 |
| 2,369,901 | Kozaroczy | Feb. 20, 1945 |
| 2,810,310 | Sanders | Oct. 22, 1957 |